(12) United States Patent
Kastner (10) Patent No.: US 10,807,295 B2
(45) Date of Patent: Oct. 20, 2020

(54) FILTER DEVICE AND FILTER METHOD (71) Applicant: Next Generation Analytics GmbH, Grieskirchen (AT)

(72) Inventor: Friedrich Kastner, Grieskirchen (AT)

(73) Assignee: Next Generation Analytics GmbH, Grieskirchen (AT)

( * ) Notice: Subject to any disclaimer, the term of this patent is extended or adjusted under 35 U.S.C. 154(b) by 239 days.

(21) Appl. No.: 15/551,655

(22) PCT Filed: Feb. 16, 2016

(86) PCT No.: PCT/AT2016/050029
§ 371 (c)(1),
(2) Date: Oct. 20, 2017

(87) PCT Pub. No.: WO2016/131071
PCT Pub. Date: Aug. 25, 2016

(65) Prior Publication Data
US 2018/0065288 A1    Mar. 8, 2018

(30) Foreign Application Priority Data

Feb. 19, 2015    (AT) .............................. A 50127/2015
Dec. 21, 2015    (DE) ........................ 10 2015 226 348

(51) Int. Cl.
*B29C 48/50*     (2019.01)
*B29C 48/692*    (2019.01)
(Continued)

(52) U.S. Cl.
CPC ........ *B29C 48/503* (2019.02); *B29C 48/2725* (2019.02); *B29C 48/2735* (2019.02);
(Continued)

(58) Field of Classification Search
None
See application file for complete search history.

(56) References Cited

U.S. PATENT DOCUMENTS 546,241 A * 9/1895 McAnulty ................. B07B 1/46
                                                209/320
1,181,729 A    5/1916 Brown
(Continued)

FOREIGN PATENT DOCUMENTS

CN    102091456 A    6/2011
DE    2 753 864 A1    6/1979
(Continued)

OTHER PUBLICATIONS

International Search Report of PCT/AT2016/050029, dated Oct. 19, 2016.

*Primary Examiner* — Robert J Popovics
(74) *Attorney, Agent, or Firm* — Collard & Roe, P.C.

(57) ABSTRACT

The invention relates to a filter device comprising an inlet chamber, an outlet chamber, a filter system which separates the inlet chamber and the outlet chamber. The filter device is characterised in that the inlet chamber comprises at least one liquid supply line and at least one liquid discharge line and the outlet chamber does not comprise a liquid supply and comprises at least one liquid discharge line. The invention also relates to a corresponding filter method.

2 Claims, 5 Drawing Sheets

(51) Int. Cl.
  *B29C 48/69* (2019.01)
  *B29C 48/27* (2019.01)
  *B29C 48/70* (2019.01)
  *B29C 48/80* (2019.01)
  *B29C 48/92* (2019.01)
  *B29C 48/693* (2019.01)

(52) U.S. Cl.
  CPC .......... *B29C 48/692* (2019.02); *B29C 48/693* (2019.02); *B29C 48/70* (2019.02); *B29C 48/802* (2019.02); *B29C 48/92* (2019.02)

(56) References Cited

U.S. PATENT DOCUMENTS

| | | | | |
|---|---|---|---|---|
| 1,840,153 | A | 1/1932 | Bull | |
| 3,217,561 | A * | 11/1965 | Allgaier | B07B 1/36 74/600 |
| 3,354,250 | A | 11/1967 | Killoran et al. | |
| 3,361,263 | A | 1/1968 | Street | |
| 3,471,024 | A | 10/1969 | Doucet | |
| 3,478,874 | A * | 11/1969 | McLean | B01D 17/045 17/45 |
| 3,497,063 | A * | 2/1970 | Hirs | B01D 24/04 210/777 |
| 3,568,844 | A * | 3/1971 | Coffelt | C12G 1/005 210/327 |
| 3,668,837 | A | 6/1972 | Gross | |
| 3,672,507 | A | 6/1972 | Paull, Jr. | |
| 3,760,945 | A * | 9/1973 | Davis | B01D 25/285 210/143 |
| 3,817,377 | A | 6/1974 | Piggott | |
| 3,856,680 | A * | 12/1974 | Elmore | B29C 48/6912 210/184 |
| 3,932,442 | A * | 1/1976 | Salmon | B07B 1/36 209/309 |
| 3,940,335 | A * | 2/1976 | Kalman | B01D 29/096 210/780 |
| 4,010,391 | A | 3/1977 | Kalman | |
| 4,080,297 | A * | 3/1978 | Yoshida | B01D 29/09 210/387 |
| 4,445,566 | A * | 5/1984 | Laing | F28D 9/04 165/10 |
| 4,446,017 | A * | 5/1984 | Oberg | B01D 29/055 210/90 |
| 4,545,862 | A * | 10/1985 | Gore | B01D 61/364 203/10 |
| 4,664,813 | A * | 5/1987 | Schneider | B01D 29/096 210/771 |
| 4,755,290 | A | 7/1988 | Neuman et al. | |
| 4,888,110 | A * | 12/1989 | Fogarty, Jr. | B01D 29/76 210/106 |
| 5,059,318 | A * | 10/1991 | Benesi | B01D 29/096 210/227 |
| 5,061,170 | A * | 10/1991 | Allen | D01D 1/04 425/197 |
| 5,304,053 | A * | 4/1994 | Gohlisch | B29C 48/30 425/204 |
| 5,308,508 | A * | 5/1994 | Womack | B01D 29/096 210/767 |
| 5,415,781 | A * | 5/1995 | Randhahn | B01D 29/055 210/650 |
| 5,443,723 | A * | 8/1995 | Stankowski | B01D 63/087 210/321.75 |
| 5,462,677 | A * | 10/1995 | Benesi | B01D 29/096 210/791 |
| 5,484,539 | A * | 1/1996 | Tersi | B01D 29/114 210/774 |
| 5,503,743 | A * | 4/1996 | Oh | B01D 29/03 210/248 |
| 5,556,592 | A * | 9/1996 | Hitchings | B01D 29/096 164/134 |
| 5,676,731 | A * | 10/1997 | Hitchings | B01D 29/096 164/134 |
| 5,798,041 | A * | 8/1998 | Zuk, Jr. | B01D 29/012 210/456 |
| 5,938,940 | A * | 8/1999 | Zuk, Jr. | B01D 65/00 210/767 |
| 5,975,312 | A * | 11/1999 | Bonsan | B01D 29/90 210/439 |
| 6,071,425 | A * | 6/2000 | Vartiainen | B01D 25/28 210/791 |
| 6,099,725 | A * | 8/2000 | Silverstein | B01D 25/1275 210/227 |
| 6,149,807 | A * | 11/2000 | Previero | B01D 29/096 210/236 |
| 6,159,359 | A * | 12/2000 | Benesi | B01D 25/1275 210/87 |
| 6,168,718 | B1 * | 1/2001 | Sutter | B01D 63/081 210/436 |
| 6,216,880 | B1 | 4/2001 | Previero | |
| 6,325,922 | B1 * | 12/2001 | Schaller | B01D 29/05 210/90 |
| 6,375,013 | B1 * | 4/2002 | Gail | B01D 29/09 210/391 |
| 6,491,817 | B1 * | 12/2002 | Benesi | B01D 25/1275 210/227 |
| 6,521,135 | B1 * | 2/2003 | Benesi | B01D 25/1275 210/771 |
| 6,916,425 | B2 * | 7/2005 | Lotz | C12C 7/16 210/650 |
| 7,011,741 | B2 * | 3/2006 | Benesi | B01D 25/1275 210/97 |
| 7,029,579 | B2 * | 4/2006 | Tapp | B01D 29/09 210/193 |
| 7,439,004 | B2 * | 10/2008 | Malachowski | G03G 9/0815 430/137.1 |
| 7,531,086 | B2 * | 5/2009 | Benesi | B01D 25/325 210/143 |
| 7,674,386 | B2 * | 3/2010 | Benesi | B01D 29/843 210/741 |
| 7,815,808 | B2 * | 10/2010 | Benesi | C02F 11/128 210/741 |
| 7,820,039 | B2 | 10/2010 | Schulz | |
| 7,824,544 | B2 | 11/2010 | Ettlinger | |
| 8,057,685 | B2 * | 11/2011 | Laing | B01D 29/055 210/744 |
| 9,314,719 | B2 * | 4/2016 | McAlister | B01D 24/405 |
| 2003/0127401 | A1 * | 7/2003 | Benesi | B01D 25/284 210/771 |
| 2005/0274660 | A1 * | 12/2005 | Benesi | B01D 25/1275 210/138 |
| 2006/0021949 | A1 | 2/2006 | Dolan et al. | |
| 2006/0027492 | A1 | 2/2006 | Lin | |
| 2006/0027509 | A1 * | 2/2006 | Benesi | B01D 29/60 210/770 |
| 2006/0102545 | A1 * | 5/2006 | Benesi | B01D 29/096 210/224 |
| 2006/0283785 | A1 * | 12/2006 | Benesi | B01D 29/843 210/85 |
| 2007/0256984 | A1 * | 11/2007 | Benesi | B01D 29/09 210/741 |
| 2009/0308818 | A1 * | 12/2009 | Laing | B01D 29/6476 210/744 |
| 2010/0096341 | A1 * | 4/2010 | Benesi | B01D 29/843 210/771 |
| 2010/0300991 | A1 * | 12/2010 | Hampton | B01D 24/08 210/806 |
| 2015/0048016 | A1 | 2/2015 | Hartmann et al. | |
| 2016/0333305 | A1 * | 11/2016 | Pilkington | A61M 1/00 |
| 2018/0065288 | A1 * | 3/2018 | Kastner | B29C 48/2735 |
| 2018/0104625 | A1 * | 4/2018 | Kastner | B01D 33/0183 |

FOREIGN PATENT DOCUMENTS

| | | | |
|---|---|---|---|
| DE | 199 16 539 | A1 | 10/2000 |
| DE | 103 15 906 | A1 | 4/2004 |
| DE | 203 19 752 | U1 | 5/2005 |
| DE | 10 2012 100 641 | A1 | 1/2013 |
| DE | 102016202489 | A1 * | 8/2016 ............ G01N 11/04 |

(56) References Cited

FOREIGN PATENT DOCUMENTS

| | | | |
|---|---|---|---|
| DE | 102015226348 A1 * | 6/2017 | ........... B29C 48/691 |
| EP | 1 550 544 A1 | 7/2005 | |
| EP | 1 645 396 A2 | 4/2006 | |
| EP | 3308940 A1 * | 4/2018 | ........... B01D 33/466 |
| JP | 2009-107330 A | 5/2009 | |
| WO | 02/00321 A1 | 1/2002 | |
| WO | 2008/031127 A1 | 3/2008 | |
| WO | WO-2016131072 A2 * | 8/2016 | .......... B29C 48/2735 |
| WO | WO-2016131072 A3 * | 12/2016 | ........... B29C 48/693 |

* cited by examiner

FILTER DEVICE AND FILTER METHOD

CROSS REFERENCE TO RELATED APPLICATIONS

This application is the National Stage of PCT/AT2016/050029 filed on Feb. 16, 2016, which claims priority under 35 U.S.C. § 119 of Austrian Application No. A 50127/2015 filed on Feb. 19, 2015 and German Application No. 10 2015 226 348.7 filed on Dec. 21, 2015, the disclosures of which are incorporated by reference. The international application under PCT article 21(2) was not published in English.

BACKGROUND OF THE INVENTION

Field of the Invention

The invention relates to a filter device and a filter method for filtering viscous fluids, in particular fluid plastics.

Description of the Related Art

Filters are generally used for removing impurities, such as e.g. metals, sand, dust or gel particles from viscous fluids, e.g. plastics in fluid form, the term "filter" also including screens in the present invention.

In previously known methods fluids are pressed through a filter. To clean the filter the latter is often replaced. Alternatively, filters are also cleaned by means of a slide, in that the slide is guided over the filter surface and pushes impurities to the edge which would otherwise block up the filter.

The disadvantage of previously used devices and methods is that generally a large proportion of the impurities are pushed through the filter directly with the viscous fluid directly or by the filter. In particular, gel particles are comminuted by the slide and parts are then pushed through the filter.

SUMMARY OF THE INVENTION

The objective of the present invention was to overcome the disadvantages of the prior art and provide a filter device and a filter method, by means of which a user is able to filter viscous fluids more effectively and simply.

Said objective is achieved by a filter device and a filter method according to the claims.

The filter device according to the invention comprises an inlet chamber, an outlet chamber, a filter system, which separates the inlet chamber and outlet chamber, wherein the inlet chamber comprises at least one liquid supply line and at least one liquid discharge line and the outlet chamber comprises no liquid supply line and at least one liquid discharge line.

According to one particular embodiment the filter is arranged such that the flow direction of the fluid relative to the surface normal of the filter runs at an angle of between 10° and 90°, in particular between 30° and 70°. The filter is thus preferably inclined relative to the inflowing fluid.

The filter method according to the invention for filtering viscous fluids comprises the steps:
 inflow of viscous fluid into a filter system, wherein the pressure P(F) exerted by the flow of fluid onto the surface of the filter is lower than the pressure of the flow of said fluid onto a surface orthogonal to the flow direction of the fluid P(S), and in particular P(F)/P(S) <90%, particularly preferably P(F)/P(S)<70%,
 removal of the fluid that has passed through the filter system,
 removal or return of the fluid that has not passed through the filter system.

Of course P(F) also takes into consideration the pressure of the fluid that has passed through the filter system, as the formulation "surface of the filter" does not include the filter surface (apart from holes) but the whole surface on which the filter system is arranged, including the openings of the filter system. The phrase "the closed surface element covering the filter system" would also be suitable here.

The inlet chamber is firstly simply a chamber through which the incoming fluid flows. Likewise the outlet chamber is simply a chamber through which outflowing fluid flows. Both chambers can have a particular design according to their application, but in a simple application can also correspond to just a section of pipe. In the following the term "inlet area" is also used. This is the area of the inlet chamber where the inflowing fluid enters and comes into contact with the filter.

For the invention it is only necessary for the inlet chamber and outlet chamber to be separated by the filter system, so that fluid can only pass through the filter system from the inlet chamber to the outlet chamber.

The liquid supply line can firstly consist of any device which can feed fluid into the inlet chamber. Even though it can have a specific design in preferred embodiments, in a simple case it can be formed by the section of a pipe which passes over an inlet area.

The liquid discharge line can firstly consist of any device which allows fluid to flow out of one of the two chambers. Of course, this excludes the passage through the filter which is not considered to be a liquid discharge line in the same way. Even though it can have a specific design in preferred embodiments, in a simple case it can be formed by the section of a pipe which comes from an inlet or outlet area.

Preferably, there is no direct contact between a liquid discharge line of the inlet area and a liquid discharge line of the outlet area, in order to prevent the contamination of the filtered fluid. Depending on the embodiment however it may still be preferable if there is contact between a liquid discharge line of the inlet area and a liquid discharge line of the outlet area, e.g. by means of an additional filter or other cleaning devices.

The liquid discharge line of the inlet area is the reason for the difference in pressure in the method of the invention described above. The fluid pushes on the filter not with all of its pressure but a portion of the fluid moves out through the liquid discharge line of the inlet area and does not pass through the filter. In a preferred embodiment the filter is arranged to be inclined relative to the flow of fluid, so that the greatest possible amount of fluid comes into contact with the filter and it is possible that this amount (or a proportion of the latter) can pass through the filter.

Impurities are carried along by the fluid flowing past the filter and do not pass through the filter, which is also achieved by the pressure difference: the fluid does not flow exclusively through the filter system but also alongside the filter system.

In this way a portion of the fluid with impurities can exit the inlet area through the liquid discharge line of the inlet area without having to pass through the filter.

The inlet of fluid to the inlet area can take place in a prespecified position or also by means of a feed dispenser. It is also preferred for some embodiments that the liquid supply line is configured so that it is movable, in particular rotatable, relative to the filter, the rest of the device and/or the liquid discharge lines.

According to a preferred embodiment the filter system comprises a filter belt and is particularly suitable for plastic melts. Filter devices which use a filter belt or "screen belt", are known in principle. A filter belt is a belt, made mostly of metal or from a temperature-resistant fabric, which is provided with a plurality of small openings, which are smaller than the particles to be filtered out. After a time said belt gets clogged up with particles. Unlike filters with replaceable filter elements, in belt filters the belt is shifted so that a new portion of the belt is positioned in the filter area. Often the filter belt is supported by a special perforated plate or a grid in the filter or a combination of both elements.

In the following a filter belt is referred to as the filter medium. Generally, the latter is a "belt screen", i.e. a carrier material provided with holes, (e.g. made of steel sheet). However, the latter can also be a fabric filter or any other possible belt-like filter media suitable for filtering. Preferred filters comprise materials from a group including fabric, knitted fabric, fleece, needled filter materials, calendered filter materials and staple fibre webs (in particular made of metal, natural and artificial fibres). Also lasered, etched, stamped or needled belts made of films, plastics, metals, fleeces or papers or combinations of two or more of the aforementioned filters are preferred. Fabrics, knitted fabrics made of metals or alloys and/or natural or plastic fibres or mineral fibres are preferred. Here the fabric can also be made from mixtures of materials, i.e. different threads can be used. It is also possible that the different fabrics can be arranged above one another, wherein layering with different degrees of fineness is preferred. The fabrics can also contain reinforcements to ensure greater tensile strength as well as fine filtration.

Furthermore, it is possible to use belts made of metal, plastics etc. in the form of composite materials or in composites with fabrics. The belts can be stamped, etched, lasered or needled individually in advance or in said composite and can also be used in combinations of technologies.

Particularly preferred embodiments of the filter belts include:
- belt, which comprise a solid carrier material which is provided with holes, which in particular have been stamped, etched, lasered or bored, wherein the carrier material is made of metal, paper or plastic,
- belts which form a fabric filter and comprise fabrics, knitted fabrics, fleeces, needled filter materials, calendered filter materials and staple fibre webs, wherein preferred materials are metal fibres, plastic fibres, glass fibres, carbon fibres or natural fibres,
- belts which are made from layers of combinations of the aforementioned belts.

A preferred filter device, in particular in the form of a belt filter, comprises an inner chamber surrounded by walls, which comprises an inflow (liquid supply line) and an outflow (liquid discharge line) for a melt (in particular on the same side or on opposite sides of the inner chamber), wherein the inflow (liquid supply line) and outflow (liquid discharge line) are separated by a filter belt. The invention is characterised in that the inflow and/or the outflow is positioned outside the projection of the filter position parallel to the perpendicular bisector of the filter position, minus an edge area of the filter area corresponding to the diameter of the inflow relative to the position of the inflow and the diameter of the outflow relative to the position of the outflow.

This preferred embodiment, particularly in the embodiment as a belt filter, takes into account the fact that the melt is pressed through the filter at comparatively high pressure (in the order of 10-100 bar but sometimes also up to 300 bar) and the side areas of the filter therefore have to be sealed extremely effectively from leaks of material.

The advantage of this preferred embodiment is that the previously used systems are very large and cannot be arranged in a space-saving manner, and that particularly in a belt filter design the continual displacement of belt is not possible or is only possible with difficulty particularly in the case of heavily contaminated melts. The filter belt is heavily contaminated with impurities on its passage through the filter which can cause problems with sealing.

The liquid supply line into the inlet chamber and/or the liquid discharge line of the outlet chamber is positioned outside the projection of the filter position parallel to the perpendicular bisector of the filter system, minus an edge area of the filter system according to the diameter of the liquid supply line relative to the position of the liquid supply line and the diameter of the liquid discharge line relative to the position of the liquid discharge line.

The fact that the liquid supply line and/or the liquid discharge line (preferably both the liquid supply line and the liquid discharge line) are arranged outside the projection of the filter system parallel to the perpendicular bisector of the filter systems means that when the filter system is viewed from above (along its perpendicular bisector), the liquid supply line and/or liquid discharge line may not be located above the filter system, apart from the edge of the filter system, that they are allowed to project over with their diameter. Preferably however, the liquid supply line and/or liquid discharge line are located completely outside the relevant projection of the filter system.

Preferred positions for the liquid supply line/liquid discharge line are to the side of the filter system or on its upper/lower sides but only on the edge. This has the advantage that the melt flows over large portions of the filter system (more than 50%) tangentially to the latter and the filtration is thereby more effective and cleaner.

Preferably, the liquid supply line and/or liquid discharge line are arranged laterally relative to the filter system, so that they run in the inner chamber with their longitudinal axis perpendicular to or parallel to the filter system.

Preferably, the liquid supply line and liquid discharge line are arranged respectively on opposite sides of the device. This has the advantage that melt in the device flows virtually tangentially through the filter system which results in very effective filtration. In addition, this construction enables the stacking or serial arrangement of a plurality of devices. In addition, the path lengths are always the same in the melt flow, whereby there is no need to have displacement bodies which are used in the prior art to provide even use of the screen.

Preferably, the liquid supply line and liquid discharge line are oriented orthogonally relative to the perpendicular bisectors of the filter system inclined by no more than 45°, in particular by less than 20°, wherein this indicates the inclination of the flow direction, i.e. the longitudinal axis of the liquid supply line/liquid discharge line. An orthogonal arrangement relative to said surface normal is particularly preferred.

Preferably, the liquid supply line and liquid discharge line are inclined relative to a direction parallel to the width extension of the filter system by not more than 45°, in particular by less than 20° (or even less than 2°), wherein this represents the inclination of the flow direction, i.e. the longitudinal axis of the liquid supply line/liquid discharge line.

According to a preferred embodiment the liquid supply line and/or liquid discharge line are arranged so that the inflowing or outflowing melt moves parallel or orthogonally to the direction in which a filter belt is displaced with a change of the filter surface.

Preferably, the liquid supply line and/or liquid discharge line are arranged so that the inflowing or outflowing melt moves parallel to the plane of the filter system and/or parallel to the longitudinal axis of the filter.

In the following the liquid discharge line in the inlet chamber is also referred to as the primary melt discharge line.

Preferably, the liquid supply line is located at the top and the liquid discharge line at the bottom. This has the advantage that impurities automatically sink downwards due to gravity and the prevailing melt flow and in particular can be removed specifically by an additional primary melt discharge line.

According to the invention the device comprises a primary melt discharge line, which has the advantage that impurities can be discharged easily. Particularly in filter belts such impurities cause obstructions to the further movement of the filter belt or have to be compensated by wider passageways for the filter belt out from the inner chamber, which reduces the sealing effect at this point. With an effective discharge of impurities out of the inner chamber the filter belt can be guided out of the inner chamber through a comparatively narrow opening, which can be sealed very effectively because of its narrow width.

Preferably, the device (in particular in the embodiment as a belt filter) also comprises a discharge unit, which actively guides melt out of the inner chamber through the primary melt discharge line. Said discharge unit preferably comprises elements from a group including conveying screws, suction devices, presses, slides and flushing nozzles.

Impurities can be removed from the inner chamber by the discharge unit. It is thus possible to move the area of the filter, which is contaminated the most with impurities, out of the inner chamber during the filtration of the melt and allow clean filters areas of the filter belt on the other side to follow. This would correspond to filter transport during operation and thus enable continuous filtering. By removing impurities the concentration of dirt in the inner chamber will not increase.

The geometry of the screw is dependent on the filter material used, the type dirt to be expected and the filtered plastics. The elements used for this have to be hard enough not to wear and to retain their shape at the prevailing temperatures.

Preferably, the relevant elements comprise materials from a group comprising temperature-stable plastics, ceramic, glass and metal; and in particular also have a surface coating or armour plating, as already known to persons skilled in the art from extruder screws. Preferably, the surface coating is formed by means of curing, plasma nitriding, chromium plating, nickel-plating, wherein layers comprising DLC (diamond-like carbon), carbides, CrN or TiN are preferred for the surfaces. For the surface coating a plasma coating or blaze coating are preferred.

If a screw is used as a discharge unit, the latter is preferably configured so that it has steeper passages in the area of the filter belt than in the area where it discharges. This has the advantage that the impurities can be carried away effectively and rapidly by the filter system (e.g. a filter belt) by the steep passageways and in the area where it discharges can reduce the pressure by having flatter passageways.

Preferably, the primary melt discharge line with the discharge unit (e.g. a pipe, which guides a cleaning screw) is arranged to be perpendicular to the filter system. If a conveying screw is used, the latter is preferably shaped so that it runs for the removal of material in or against the advancing direction of the filter belt and in particular is equipped with different cleaning bars, brushes, nubs, etc.

According to a preferred embodiment the effective area of the discharge unit extends over the whole width of the filter position, so that a filter system (e.g. a filter belt) can be free of impurities over its whole width. It is also an advantage if the discharge unit (and in particular also the primary melt discharge line) is arranged in the inner chamber where the filter belt is pushed out of the latter as required. In this way it is possible to remove impurities from where they have a particularly negative effect, namely when pushing out a filter belt.

According to a preferred embodiment, the device comprises (in particular in the form of a belt filter) a cleaning system for the filter belt outside the inner chamber at the outlet point of the filter belt or inside the inner chamber. Said embodiment also represents an independent invention, in which the liquid supply line and liquid discharge line do not necessarily need to be arranged at the side of the filter position or a primary melt discharge line provided. It supplements said embodiments very advantageously in that it enables the return of the filter belt.

Preferably, the cleaning system comprises a cleaning element or two or more cleaning elements, in particular elements from a group comprising scrapers, rollers, burners and screws, which clean the filter belt. The movement of the cleaning elements can run relative to the advancing direction of the filter belt in the same or opposite directions. When using several cleaning elements the latter can run in the same or opposite directions.

Preferably, said embodiment comprises a filter belt in the form of an endless belt. By cleaning the screen (e.g. mechanical cleaning and back-flushing) the latter can be re-used as a functional screen and can thus also be returned to the filter. By means of the configuration as an endless belt it is possible to reduce the number of filter belts and provide a compact structure.

In the preferred alternative, in which the cleaning system for the filter belt is arranged outside of the inner chamber at the outlet point of the filter belt, the operation could be performed continuously.

In the alternative in which the cleaning system is arranged inside the inner chamber a very compact and inexpensive structure can be formed. Elements can also be used which have already been described above, in particular the primary melt discharge line together with the discharge unit. In particular, with a brief reversal of the melt flow impurities released from the filter belt can be removed by said elements rapidly from the filter belt and out of the inner chamber.

According to a preferred embodiment the device (in particular in the form of a belt filter) in addition to a discharge unit (e.g. a screw) comprises a scraper as a cleaning element in the inner chamber, which is arranged so that it actively cleans the filter system (e.g. a filter belt) and thereby pushes the impurities at least partly in direction of the discharge unit. A cleaning roller is also preferred as the scraper.

The geometry of the scraper is dependent on the filter material used, the type of impurity to be expected and the filtered plastics. The elements used for this have to be hard enough not to wear but preferably also soft and flexible enough not to damage the filter system, or at least shaped so that they do not damage the filter system. In addition, they have to remain in a stable shape at the prevailing temperatures.

Preferred materials for the scrapers include materials from a group comprising temperature stable plastics, ceramic, glass and metal. The scrapers also have in particular a surface coating, as described above with regard to the elements of the discharge unit.

According to a preferred embodiment, the cleaning system can be replaced as a unit or its individual cleaning elements can be replaced, without fully opening the filter. For this the device preferably has melt-tight closable openings in its housing, through which the whole cleaning system or its cleaning elements can be reached and removed.

According to a preferred embodiment the cleaning elements (e.g. the scrapers) are fitted with elements made of plastic, copper, brass, bronze or harder elements, in particular metal or ceramic sintered elements.

Any media can be used as filters which are made from a base material which is provided with openings.

Preferred filters comprise plates provided with openings, fibre composites (worked, knitted, woven staple fibre webs, needled, calendered, or grids (e.g. screens). The openings can be lasered, stamped, bored or etched. The filters can be woven, knitted, calendered, needles as staple fibre webs and/or calendered, sintered from solid materials or produced by means of pressing fibres.

Furthermore, preferred filters contain particles, which are suitable for filtering the respective viscous fluid, in particular particles from a group comprising metal and/or ceramic particles, sands, salts and plastic plastics.

According to a preferred embodiment the particles are surface modified so that they have a surface which has been enlarged by treatment or provided with additional materials. In particular, the surface of the particles is designed to be hydrophobic or hydrophilic.

According to a preferred embodiment, which can also represent an independent invention without the aforementioned filter device, and compared to the prior art provides an improved cleaning effect and better protection from the unwanted transit of particles, the filter is formed by means of a plate, in which holes are formed (sieve plate), wherein the end faces of the holes are inclined relative to the longitudinal axis of the filter and/or the walls of the holes are inclined relative to the orthogonal of the longitudinal axis of the filter. Said inclination is in particular greater than 10°, preferably greater than 30°, in some applications preferably greater than 60° and in case of the end sides can also be 90° or more.

According to a preferred embodiment the orientation of the filter relative to the predefined flow direction of the fluid is such that the fluid does not hit the filter orthogonally, but the filter is arranged such that the flow direction of the fluid runs relative to the surface normal of the filter at an angle between 30° and 90°.

In conjunction with the aforementioned embodiment the holes are aligned relative to the fluid flow so that the surface normal of the inclined end faces and/or the axes of the side walls are inclined in flow direction of the fluid, i.e. are directed away from the inflow position.

Preferably, the holes in the filter are arranged such that they are in the form of a grater.

This improves the aforementioned effect further. Impurities are carried by the second flow direction of the fluid along the filter in the of the direction liquid discharge line of the inlet area, and due to the particular arrangement or shape of the holes the impurities no longer pass through the filter on their route. The particular form and/or arrangement of the holes also prevents particles or gels from catching.

According to a preferred embodiment the filters have a curved shape and are arranged in particular to be parallel to one another, for example like two parallel cylinder casings. A concentric arrangement is preferable here.

A conical shape of the filters is also preferred, which are also arranged parallel to one another in particular, such as e.g. on two parallel conical surfaces.

According to a preferred embodiment at least three filters are arranged about a central filter, in particular on a rotatable surface. The arrangement is preferable radial, wherein the filters are not oriented to be parallel to the beams but are tilted in the same direction of rotation so that from above it looks like a spiral.

According to a preferred embodiment the base of the inlet chamber comprises the filter system or said base is formed at least partly by the filter system. This has the advantage that the inflowing fluid is pushed through the filter system solely by its own gravity, whilst it flows through the inlet chamber to the liquid discharge line of the inlet chamber.

The liquid supply line is preferably attached centrally over the filter system or at the side of the inlet chamber and in particular parallel to the surface normal of the filter system (inflow from above onto the filter system) or orthogonal to the surface normal of the filter system (inflow laterally to the filter system).

In order at a given flow speed of the fluid and compact form of the device to enable a longer resting time of the fluid above the filter system, according to a preferred embodiment flow elements are attached over the filter system which control the flow of the fluid so that it does not flow via a direct route to the fluid outlet of the inlet chamber. Preferred flow elements have a spiral or serpentine shape.

According to a preferred embodiment, which enables a particularly compact structure, the flow elements are arranged in the form of at least one spiral. From the liquid supply line, which is preferably arranged centrally above the filter system, the fluid flows into the inlet area and is forced via the filter system in a spiral-shaped flow direction, in particular from the outside in or from the inside out, so that it flows via the filter system, in particular over 90% of the path from the fluid inlet to the liquid discharge line of the inlet chamber. At the end of its path, also preferably at the center or edge of the spiral, at least one fluid outlet is arranged in order to remove the remaining fluid out of the inlet chamber in which dirt particles have become concentrated.

According to a preferred embodiment, which provides a particularly compact tubular structure, the flow elements are arranged in the form of at least a serpentine. From the liquid supply line, which is preferably arranged on an edge of the (particularly elongated) filter system, the fluid flows into the inlet area and is guided over the filter system in alternating flow direction, in particular orthogonally to the resulting flow direction or the alignment of the pipe which forms the inlet chamber (e.g. alternately right and left). At the end of its path, i.e. preferably at the end of the pipe, at least one fluid outlet is arranged in order to remove the remaining fluid, in which dirt particles have become concentrated, out of the inlet chamber.

According to a preferred embodiment the flow elements are configured so that they do not so conduct all of the fluid, but the flow can also take place below or above it. In this way the static pressure of the fluid on the filter is reduced further.

According to a preferred embodiment, which provides a very simple and yet effective embodiment of the invention, a filter system is arranged in a pipe such that relative to the flow direction of the fluid behind the filter system the pipe is divided into two fluid outflows or one liquid discharge line branches off in front of the pipe and one liquid discharge line runs further in the pipe, wherein one of said fluid outflows is joined directly to the inlet area and another is only reached after passing through the filter system (and this then represents the outlet area and liquid discharge line of the outlet area).

It is particularly preferable if the filter system is arranged obliquely in the pipe so that it is inclined relative to its cross-sectional surface (or orthogonally to the flow direction) in particular at an angle between 10° and 90°, in particular between 30° and 70°.

According to a further preferred embodiment a filter system has the form of a spiral and the device is shaped such that the through-flowing fluid flows on a wall of said spiral up to the liquid discharge line and the fluid that has passed through the filter system flows out through a different liquid discharge line. In this way the filter surface can be increased in a small amount of space compared to the preceding embodiment.

According to a preferred embodiment the filters are moved relative to the fluid or the filter device comprises a movement system, which is configured to move the filters.

According to a preferred embodiment said movement system comprises a conveying system, which is configured to move the filter, which in this case in particular has the form of a belt or a plurality of filter elements, in one direction, so that already used parts of the filter (or filter elements) are removed from the fluid flow and unused parts of the filter (or filter elements) are moved into the fluid flow.

According to a preferred embodiment, which can be combined in particular with the aforementioned conveying system, the movement system comprises a vibration system, which is designed to move at least one filter back and forth at a frequency of >1 Hz. This is used for the brief, local reduction of the viscosity of the fluid. Depending on the type of fluid and viscosity it is an advantage if the vibration has a frequency>50 Hz or even >200 Hz. For the upper limit of the frequency in particular 100 kHz is advisable, as above a certain frequency there is an increase in interference.

It is also preferable if said vibrational movement of a filter takes place relative to another filter. In this way it is possible to break down gel particles which have penetrated into the filter outlets.

Preferably, the vibrations are performed transversely relative to the filter (orthogonal to the surface normal) and/or normally (parallel to the surface normal).

According to a preferred embodiment said movement system comprises a rotation system (in particular in combination with the preceding embodiments), which is designed to rotate at least two filters relative to one another. This has the advantage that on the one hand the viscosity of the surrounding fluid can be lowered and that gel particles which have penetrated into the filter outlets can also be broken down.

According to a preferred embodiment the filter device comprises a temperature control system, which is configured to heat at least one filter, in particular a filter which is in direct contact with the inflowing fluid. By means of heating the viscosity of the fluid can be reduced briefly and there can be simple passage through the filter. The temperature is preferably selected so that the inner viscosity of impurities which are heated to said temperature (e.g. gel-like impurities) is not reduced or is not reduced to the same extent as the viscosity of the fluid.

According to a preferred embodiment the viscous fluid is mixed with additives which reduce or increase the viscosity. The addition of monomers is preferable, particularly if the viscous fluid is a plastic, monomers are preferred of the kind which occur in the polymer chains of the plastic. The monomers can here have an identical chemical structure, in some embodiments it can also be an advantage if monomers are used with a different chemical structure (however in particular only insofar as said monomers are also included in the polymer chains of the plastic. The addition of monomers has the advantage that the viscosity is lowered and after the filtering process the latter do not necessarily need to be removed but can be simply bonded with the polymers.

The fluid itself can be used to clean the filter. The force which acts on the impurities is here dependent on the viscosity of the fluid and the flow speed. However, physical access to this material is complicated and a quantitative definition of the ratio of the flow speed and viscosity would exceed the bounds of this invention. It is possible for a person skilled in the art by measuring the pressure between the inlet system and outlet system and/or by visually checking to inspect the state of the filter for covering or blocking with impurities. The viscosity and/or flow speed are then adjusted so that said impurities are carried along by the fluid which is not forced through the filter.

As in some applications the viscosity of the fluid is not meant to be changed, it is an advantage in such cases, if only the flow speed is controlled in relation to this.

The advantage of this embodiment is that it is not necessary to use any additional cleaning elements and the replacement of the filter can be delayed or even avoided altogether. By means of the transverse flow and the particular embodiment of the filter plates the filter is cleaned continually.

The portion of fluid which exits through the liquid discharge line of the inlet chamber, compared to the inflowing fluid, carries an increased concentration of impurities. On the one hand because a portion of the fluid is forced through the filter and the dirt particles are not, on the other hand because the fluid has carried dirt particles from the filter.

According to a preferred embodiment this portion of fluid is separated or filtered by additional filters. This further filtering step can be performed by an additional device according to the invention and/or a very high quality filter. With a very high quality filter it could also be possible in some applications to use a conventional filter device. It would also be possible to return the fluid flow. Material can be recovered by re-filtering the fluid flow.

As described above, there is a division of the initial fluid flow. One portion flows through the filter system and contains virtually no impurities (also referred to in the following as the "filtrate"), the other portion (referred to in the following as the "residual fluid") flows through the liquid discharge line of the inlet chamber and contains the impurities which are now present in a comparatively high concentration in the residual fluid.

According to a preferred embodiment, which enables a pressure filter test even when using the present invention, the device comprises a sensor system which is configured to perform a pressure filter test on at least a portion of the residual fluid and additionally determine the flow (volume/time) of the initial fluid. In addition, the device is also configured to determine to what extent an increase in concentration of impurities in the residual fluid has occurred compared to the initial fluid.

The determination of an increase in concentration can be determined in the simplest embodiment by performing a pressure filter test on the initial fluid and the result of this measurement can be used together with the assumption that this value applies to all of the initial fluid, together with a measurement of a representative portion of the residual fluid as a constant for the normal increase in concentration. If in comparison measurements the proportion of impurities is above the measurement of the aforementioned representative portion, it is possible to conclude that there is correspondingly higher proportion of dirt in the initial fluid.

According to a further embodiment the sensor system is additionally configured to determine the pressure acting on the filter system. In this way it is possible to determine the increasing level of contamination of the filter.

According to a preferred embodiment the sensor system is additionally configured to determine the flow of the residual fluid and/or the flow of the filtrate. In this way together with the fluid measurement of the initial fluid it is possible to determine for a specific volume element of the fluid which portion is the filtrate and which portion is the residual fluid. After the pressure filter test on the relevant volume element of the residual fluid it is possible to calculate precisely the proportion of impurities in the initial fluid.

According to a preferred embodiment for the pressure filter test on a volume of residual fluid at least said volume is disconnected with respect to the static pressure from the liquid discharge line of the inlet chamber. This has the advantage that a pressure measurement during the pressure filter test is not falsified by the pressure of the remaining fluid and in addition there is no increase in pressure in the filter system by the pressure filter test. This uncoupling can be performed by taking away the relevant volume of residual fluid or by installing a fluid pump behind the liquid discharge line of the inlet chamber.

In particular in this embodiment a pressure filter test is possible during operation, wherein in connection with the preceding embodiments it is possible to determine the degree of impurity of the initial fluid. Online monitoring of the inflowing fluid is thus possible.

The device is in principle also suitable for fluids with low viscosity (<5 mPa·s), its advantage is particularly evident in fluids with viscosities>5 mPa·s, in particular >100 mPa·s. The upper limit for the viscosity is at the point where it is no longer possible to refer to flow in the conventional sense, in particular the viscosity is below 1.000.000.000.000 mPa·s.

BRIEF DESCRIPTION OF THE DRAWINGS

Examples of preferred embodiments of the filter device according to the invention are illustrated in the drawings.

DETAILED DESCRIPTION OF PREFERRED EMBODIMENTS

Figure 1:
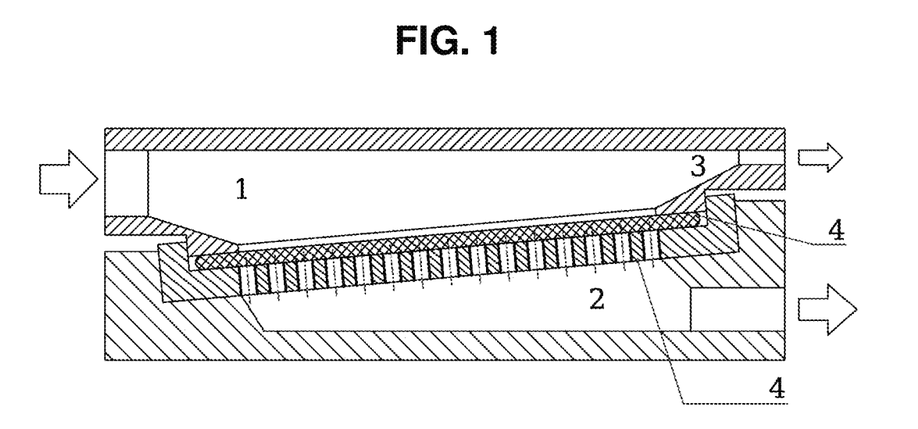
FIG. 1 shows schematically a preferred embodiment.

FIG. 1 shows a preferred embodiment, which enables a very simple yet effective implementation of the invention. A filter system 4 is arranged in a pipe so that it covers an outlet area 2 separated in the pipe. The pipe area in front of the filter system can be seen as an inlet area 1 and a further separate area of the pipe behind the filter system, which is not closed by the filter, is the liquid discharge line 3 assigned to the inlet area. The filter system 4 is arranged to be inclined in the pipe and comprises an upper screen and a lower screen support plate.

Figure 2:
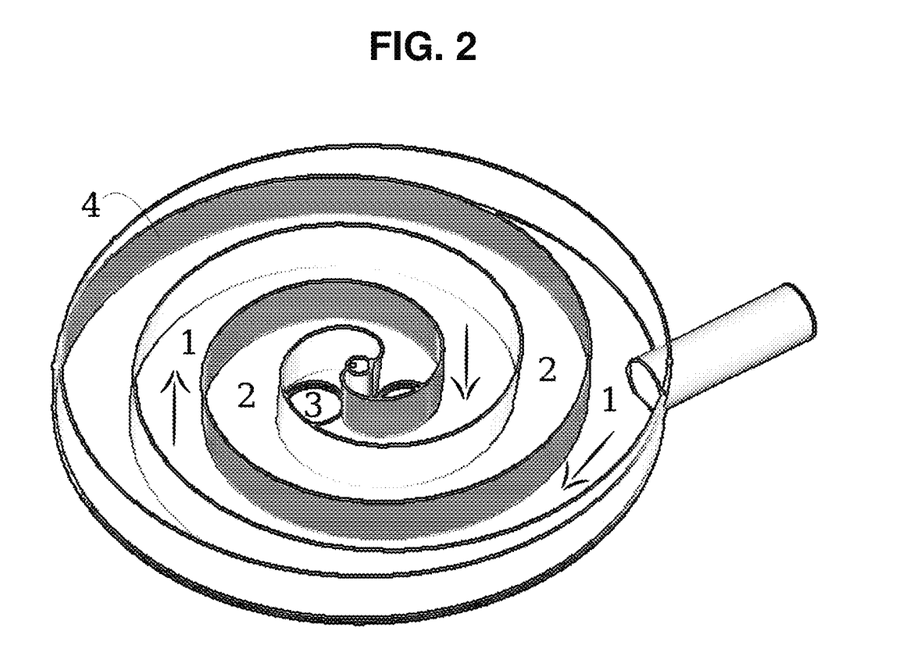
FIG. 2 shows schematically a further preferred embodiment.

FIG. 2 shows a further preferred embodiment, in which the filter system 4 has the form of a spiral. In the shown case the outlet area 2 is located on one side of the filter system and the inlet area 1 is located on the other side. There are two liquid discharge lines to the right and left of the center. The liquid discharge line 3 assigned to the inlet area is shown on the left and a portion of the liquid discharge line assigned to the outlet area 2 is shown on the right. When fluid flows through the pipe indicated on the right, which forms the liquid supply line, into the inlet chamber 1, the fluid flows along the filter system 4 and off to the center in the form of a spiral. Meanwhile fluid passes through the filter due to gravity and flows filtered through the outlet area, at the end of which it can flow off through the relevant liquid discharge line.

Figure 3:
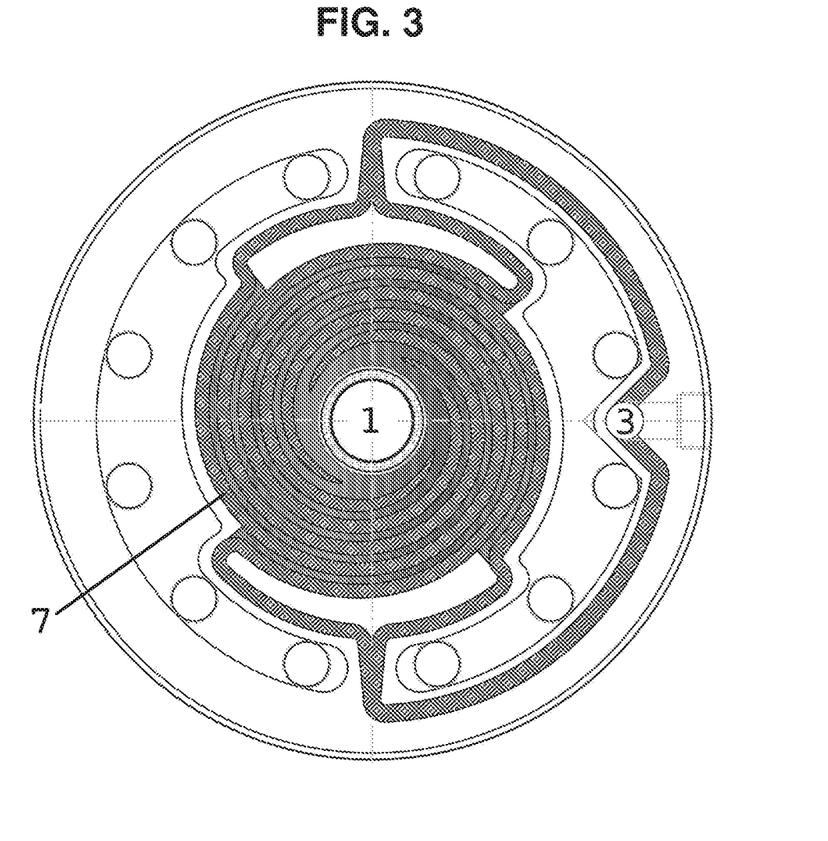
FIG. 3 shows schematically a third preferred embodiment.
Figure 4:
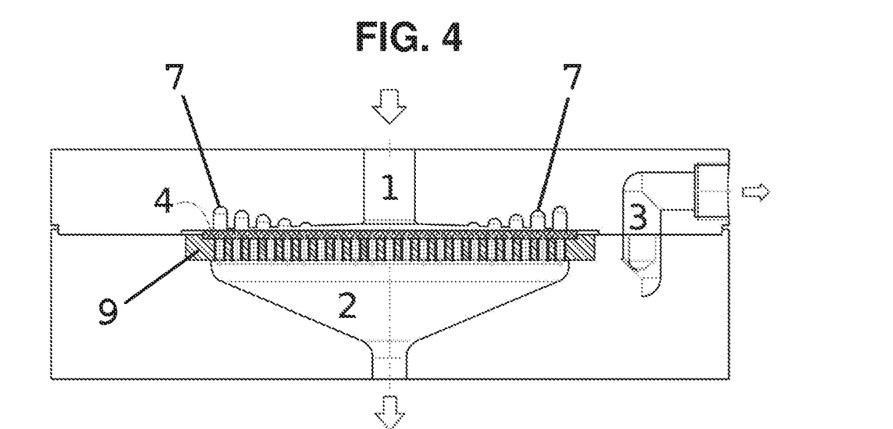
FIG. 4 shows schematically a preferred filter in spiral form from above.

FIGS. 3 and 4 shows a further preferred embodiment of a device according to the invention, wherein FIG. 3 shows the device in plan view and FIG. 4 shows the device from the side as a cross-section through the horizontal, central axis of FIG. 3.

The flow elements 7 are arranged in the form of at least one spiral. From the liquid supply line, which is preferably arranged centrally above the filter system, the fluid flows into the inlet area 1 and is forced via the filter system 4 in a spiral-shaped flow direction, in particular from the outside in or from the inside out, so that it flows via the filter system 4, in particular over 90% of the path from the fluid inlet 1 to the liquid discharge line of the inlet chamber. At the end of its path, also preferably at the center or edge of the spiral, at least one fluid outlet 3 is arranged in order to remove the remaining fluid out of the inlet chamber in which dirt particles have become concentrated. Any media can be used as filters which are made from a base material which is provided with openings. The filtration media may be a filter belt supported by a plate 9 provided with openings.

The fluid to be filtered flows through a central inlet area and moves firstly in the area marked by dashed lines (cf. FIG. 3) radially outwards, whilst a portion of it already passes through the filter 4 (cf. FIG. 4) arranged below the inlet area and the complete spiral shape in FIG. 3 into the outlet area. A spiral form (dotted area in FIG. 3) causes the fluid to make a spiral movement, wherein radial widening outwards is still possible at first, but is more difficult with an increasing radius (cf. wedge-like intermediate space below the spiral chambers in FIG. 4) and is finally no longer possible. The portion of fluid, which is not forced through the filter 4, is guided through channels to the fluid outlet 3.

Figure 5:
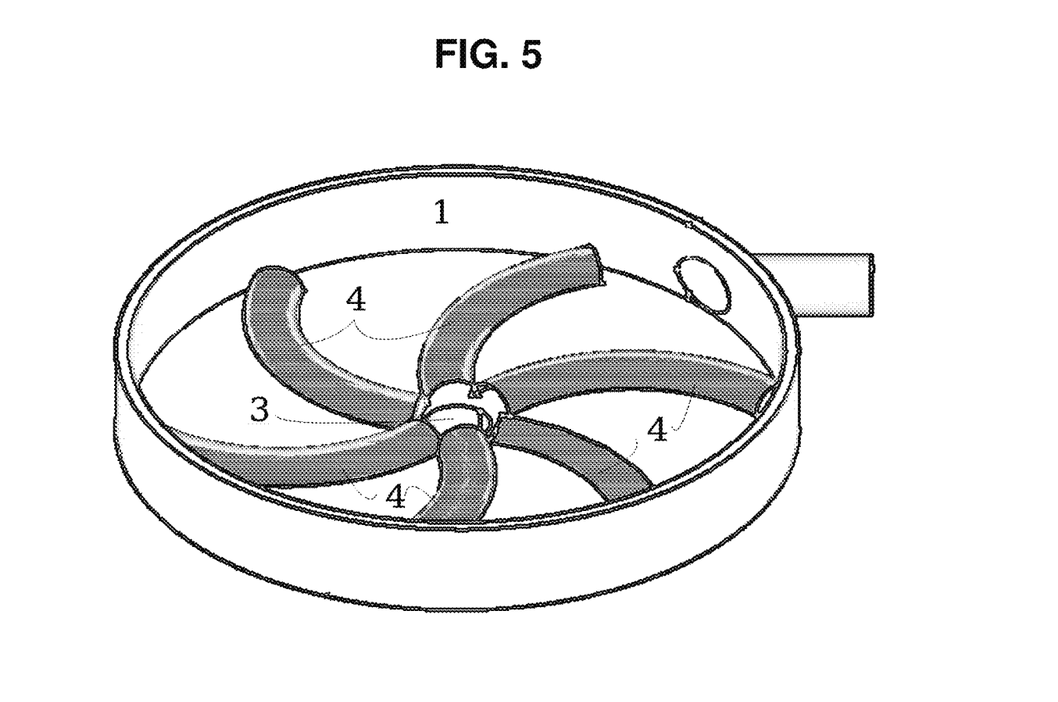
FIG. 5 shows schematically the filter in spiral form in side view.

FIG. 5 shows a further preferred embodiment, in which the filter system 4 has the form of a swirl or spiral. In the shown case the outlet area is located below the filters and is not visible. The filters do not extend in the shown case up to the upper edge of the chamber which forms the inlet area 1 but run onto its base. The liquid discharge line 3 assigned to the inlet area is located in the center. If fluid now flows through the pipe indicated on the right at the top, which forms the liquid supply line, into the inlet chamber 1, the fluid will flow via the filter of the filter system 4 and to the center in the form of a spiral. In the meantime it is guided by the form of the filter system and a portion of the fluid passes at the same time through the filter system 4 and flows off filtered.

Figure 6:
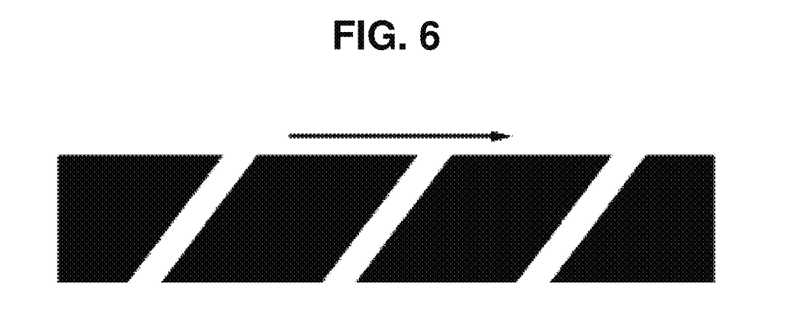
FIG. 6 shows schematically a preferred filter.
Figure 7:
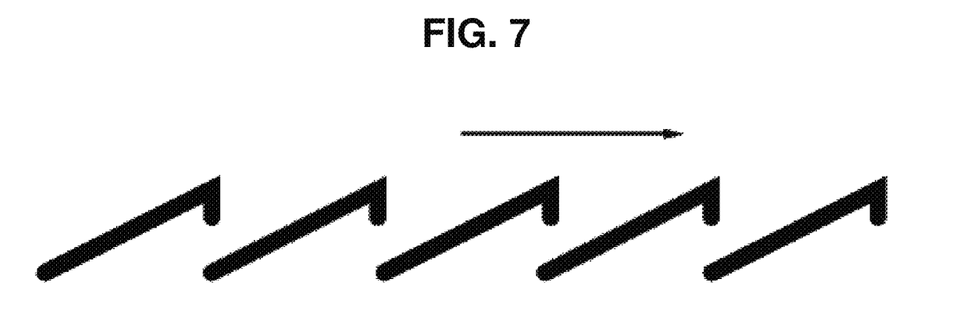
FIG. 7 shows schematically a further preferred filter.

FIGS. 6 and 7 show two advantageous filters. The arrow above the Figures indicates the flow direction of the fluid. The inlet area is above the filter is and the outlet area is below the filter.

In FIG. 6 the filter has oblique holes, which are inclined against the flow of fluid. The fluid is thus not pushed by the following fluid through the holes but on its path through the filter has to perform a change in direction of more than 90° relative to its flow direction.

In FIG. 7 the filter has the form of a sawtooth, wherein the holes are arranged respectively on the sides facing away from the fluid flow. Here too the fluid flowing over the filter on its way through the filter has to change direction by more than 90° relative to its flow direction.

Both filter forms are used in particular so that gel-like impurities are not pushed through the filter but even if they do enter one of the holes they are carried off again by the fluid flowing past.

Figure 8:
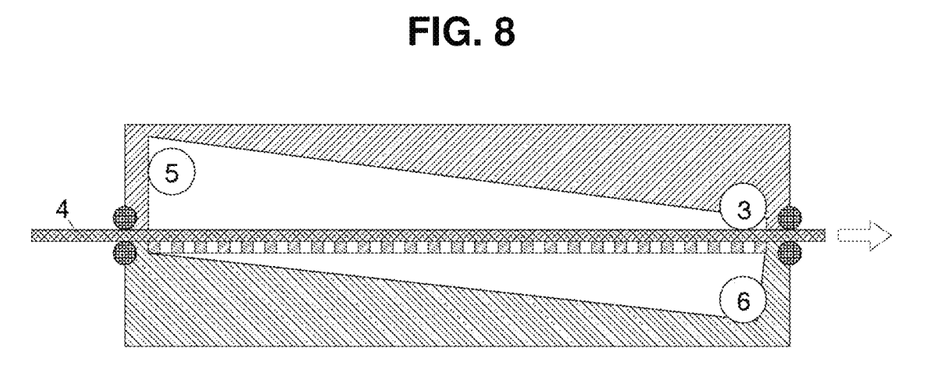
FIG. 8 shows a preferred embodiment as a belt filter in side view.

FIG. 8 shows schematically a preferred embodiment of a belt filter according to the invention in side view, in which the inflow 5 and outflow 6 are arranged on the sides of the filter 4 in the form of a filter belt. A melt can pass from the side into the inner chamber through the inflow 5, shown in cross-section (from the direction of the observer or from below the sheet plane) through the filter 4 in the form of a filter belt and can flow back out of the outflow 6 (in the direction of the observer or downwards to the sheet plane). The filter belt is in turn arranged so that the melt, in order to pass from the inflow 5 to the outflow 6, has to flow through the filter belt and cannot flow past the filter belt on a different path.

It can be seen clearly that the inflow 5 and the liquid discharge line, even if they are intended to project laterally slightly over the filter, are arranged at least in an edge area of the filter according to the diameter of the inflow 5 relative to the position of the inflow 5 and the diameter of the liquid discharge line relative to the position of the liquid discharge line.

In the inlet area of the inner chamber a primary melt outflow is shown (the liquid discharge line 3 assigned to the inlet area) through which the polluted melt can be removed from the inlet area.

Figure 9:
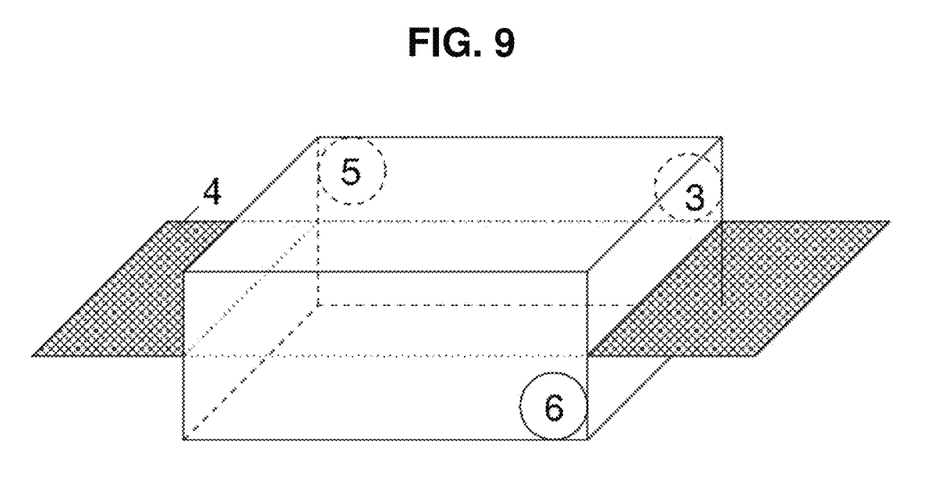
FIG. 9 illustrates a preferred embodiment in perspective view.

FIG. 9 shows in perspective a possible positioning of the inflow 5, outflow 6 and primary melt outflow (the liquid discharge line 3 assigned to the inlet area), which preferably still cooperates with a discharge unit which is not shown here. The inflow 5 is located here on the side not facing the observer, the outflow 6 on the side facing the observer and the primary melt outflow (the liquid discharge line 3 facing the inlet area) on the side facing away from the observer (but can also be arranged on the side facing the observer).

Figure 10:
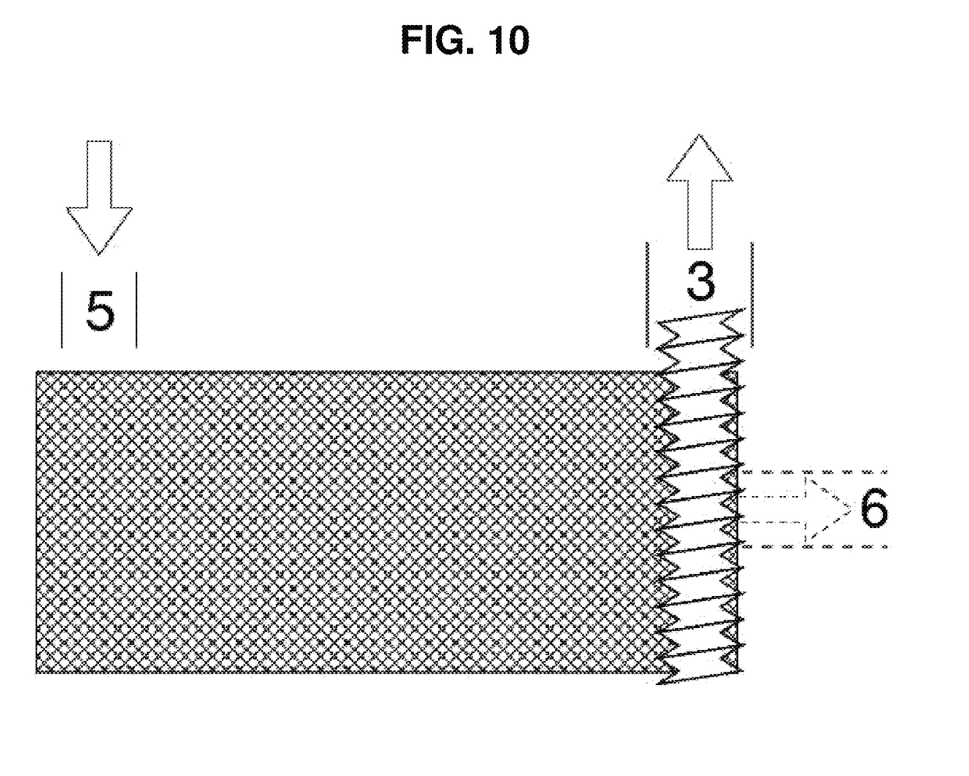
FIG. 10 illustrates a preferred embodiment from above.

FIG. 10 shows a preferred embodiment, a variation of the preceding one, from above. In the latter the primary melt outflow (the liquid discharge line 3 assigned to the inlet area) is provided with a conveying screw as a discharge unit, wherein said screw extends over the whole width of the filter belt and can move impurities over the whole width into the outflow 6 of the discharge unit (into the liquid discharge line 3 assigned to the inlet area). Here the inflow 5 is located on the side of the inner chamber (the delimitations of which are not shown here) and the outflow 6 is located underneath the filter belt, which is indicated by the dashed lines.

The invention claimed is:

1. A filter device for filtering a liquid, comprising:
   an inlet chamber for receiving a liquid to be filtered;
   an outlet chamber including at least one liquid discharge line and does not have a liquid supply line;
   a filter system at the bottom of the inlet chamber, which separates the inlet chamber and outlet chamber;
   a liquid supply line situated centrally above the filter system for introducing liquid to be filtered into a center of the inlet chamber;
   a liquid discharge line in fluid communication with said inlet chamber for discharging a portion of liquid received in said inlet chamber from said inlet chamber without passing through said filter system;
   spiral flow elements increasing in height as they extend from said center of the inlet chamber are positioned above the filter system, and control the flow of the liquid to be filtered so that it does not flow directly to the liquid discharge line;
   wherein liquid to be filtered is flowed into the inlet chamber at said center where it encounters said spiral flow elements, with some liquid passing through said filter system as it flows outwardly through said spiral flow elements, and some of the liquid being discharged, unfiltered, through said discharge line.

2. A filter device for filtering a liquid as recited in claim 1 wherein said filter system comprises a filtration medium supported by a plate having holes extending therethrough.

\* \* \* \* \*